(12) United States Patent
Lee et al.

(10) Patent No.: US 10,469,493 B2
(45) Date of Patent: Nov. 5, 2019

(54) MOBILE DEVICE, AUTHENTICATION DEVICE AND AUTHENTICATION METHODS THEREOF

(71) Applicant: NATIONAL CHENG KUNG UNIVERSITY, Tainan (TW)

(72) Inventors: Wei-Hsun Lee, Tainan (TW); Chien-Ming Chou, Tainan (TW)

(73) Assignee: National Cheng Kung University, Tainan (TW)

(*) Notice: Subject to any disclaimer, the term of this patent is extended or adjusted under 35 U.S.C. 154(b) by 207 days.

(21) Appl. No.: 15/484,946

(22) Filed: Apr. 11, 2017

(65) Prior Publication Data

US 2018/0026980 A1 Jan. 25, 2018

(30) Foreign Application Priority Data

Jul. 25, 2016 (TW) .............................. 105123426 A

(51) Int. Cl.
| | |
|---|---|
| H04L 29/06 | (2006.01) |
| G06K 7/14 | (2006.01) |
| G06K 19/06 | (2006.01) |
| H04L 9/32 | (2006.01) |
| H04W 12/06 | (2009.01) |
| G09C 5/00 | (2006.01) |

(Continued)

(52) U.S. Cl.
CPC ........ H04L 63/0876 (2013.01); G06K 7/1417 (2013.01); G06K 19/06037 (2013.01); G09C 5/00 (2013.01); H04L 9/32 (2013.01); H04W 12/06 (2013.01); *H04W 4/80* (2018.02); *H04W 12/00512* (2019.01); *H04W 12/00522* (2019.01); *H04W 84/12* (2013.01)

(58) Field of Classification Search
CPC ..... H04L 63/1425; H04L 9/32; G06K 7/1417; G06K 19/06037; G09C 5/00; H04W 12/06
See application file for complete search history.

(56) References Cited

U.S. PATENT DOCUMENTS

| | | | |
|---|---|---|---|
| 2011/0074703 A1* | 3/2011 | Black | G06F 3/0426 |
| | | | 345/173 |
| 2012/0091202 A1* | 4/2012 | Cohen | G06F 21/33 |
| | | | 235/382 |

(Continued)

FOREIGN PATENT DOCUMENTS

| | | |
|---|---|---|
| TW | 201508533 A | 3/2015 |
| TW | 201614560 A | 4/2016 |
| WO | WO 2015/027849 A1 | 3/2015 |

*Primary Examiner* — Brandon S Hoffman
*Assistant Examiner* — Thong P Truong
(74) *Attorney, Agent, or Firm* — Winston Hsu

(57) ABSTRACT

A mobile device, an authentication device and authentication methods thereof are provided. The mobile device displays a QR code on its display panel, and continuously transmits a wireless signal carrying a hardware serial number of the mobile device. The QR code stores service data including an identification code assigned to the mobile device and the hardware serial number of the mobile device. The authentication device captures the QR code from the mobile device and determines whether there is a received wireless signal carrying the hardware serial number of the mobile device. If there is a received wireless signal carrying the hardware serial number of the mobile device, the authentication device determines that the QR code passes authentication.

16 Claims, 8 Drawing Sheets

(51) Int. Cl.
  *H04W 4/80* (2018.01)
  *H04W 84/12* (2009.01)
  *H04W 12/00* (2009.01)

(56) References Cited

U.S. PATENT DOCUMENTS

2013/0185400 A1* 7/2013 Larson ................ H04L 41/0886
                                                                709/220
2014/0229387 A1   8/2014 Chow

* cited by examiner

MOBILE DEVICE, AUTHENTICATION DEVICE AND AUTHENTICATION METHODS THEREOF

This application claims priority to Taiwan Patent Application No. 105123426 filed on Jul. 25, 2016, which is hereby incorporated by reference in its entirety.

CROSS-REFERENCES TO RELATED APPLICATIONS

Not applicable.

BACKGROUND OF THE INVENTION

Field of the Invention

The present invention relates to a mobile device, an authentication device and authentication methods thereof. In particular, the mobile device of the present invention displays a quick response code (QR code) storing an identification code assigned to the mobile device and a hardware serial number of the mobile device, and transmits a wireless signal carrying the hardware serial number to the authentication device for authentication.

Descriptions of the Related Art

With the rapid advancement of wireless communication, electronic tickets have gradually replaced conventional paper tickets and found a wide application in various sectors, e.g., public transportation tickets, cinema tickets, exhibition tickets, etc. The user may receive or generate an electronic ticket on his or her mobile device and show a picture representation or codes of the electronic tickets at the entrance.

Currently, the most widely used mechanism of authenticating an electronic ticket is to display a QR code on a mobile device so that the authentication device could capture the QR code to obtain data included therein and compare the data from the QR code with the data in a database stored in a remote server for authentication. However, the QR code is liable to being stolen through copying, so the authentication only depending on the comparison between the data from the QR code and the data in the database has led to a number of security-related problems.

Accordingly, it is important to solve the security-related problems associated with using the QR code for authentication to prevent the QR code from being copied or stolen.

SUMMARY OF THE INVENTION

An objective of the present invention is to provide an authentication mechanism in which a QR code displayed by a mobile device stores both an identification code assigned to the mobile device and a hardware serial number of the mobile device and the mobile device transmits a wireless signal carrying the hardware serial number of the mobile device. When the mobile device uses the QR code for authentication by an authentication device, the authentication device not only authenticates the identification code assigned to the mobile device, but also determines whether there is a wireless signal carrying the hardware serial number of the mobile device by receiving wireless signals around in real time. Thereby, as compared with the prior art, the authentication mechanism of the present invention provides an additional real-time authentication basis by receiving wireless signals so that the security-related problems associated with using the QR code for authentication can be solved to prevent the QR code from unauthorized use.

To achieve the aforesaid objective, the present invention discloses a mobile device, which comprises a display panel, a wireless transceiver, a storage and a processor. The storage is configured to store a quick response code (QR code) for being captured by an authentication device. The QR code stores service data which includes an identification code assigned to the mobile device and a hardware serial number of the mobile device so that the authentication device determines that the identification code is valid after obtaining the service data. The processor is electrically connected to the display panel, the wireless transceiver and the storage, and is configured to enable the display panel to display the QR code, and continuously transmit a wireless signal carrying the hardware serial number via the wireless transceiver so that the authentication device determines that the QR code passes authentication according to the identification code and the hardware serial number after receiving the wireless signal carrying the hardware serial number.

The present invention further discloses an authentication device, which comprises an image capturing module, a wireless communication module and a processing module. The image capturing module is configured to capture a quick response code (QR code) from a mobile device. The QR code stores service data which includes an identification code assigned to the mobile device and a first hardware serial number of the mobile device. The wireless communication module is configured to receive a wireless signal carrying a second hardware serial number. The processing module is electrically connected to the image capturing module and the wireless communication module, and is configured to determine whether the identification code is valid and determine whether the first hardware serial number is identical to the second hardware serial number after obtaining the service data by decoding the QR code, and determine that the QR code passes authentication when the identification code is valid and the first hardware serial number is identical to the second hardware serial number.

The present invention further discloses an authentication method for use in a mobile device. The mobile device comprises a display panel, a wireless transceiver, a storage and a processor. The storage stores a quick response code (QR code) for being captured by an authentication device. The authentication method comprises the following steps of: enabling the display panel to display the QR code, the QR code storing service data which includes an identification code assigned to the mobile device and a hardware serial number of the mobile device so that the authentication device determines that the identification code is valid after obtaining the service data; and continuously transmitting a wireless signal carrying the hardware serial number via the wireless transceiver so that the authentication device determines that the QR code passes authentication according to the identification code and the hardware serial number after receiving the wireless signal carrying the hardware serial number.

The present invention further discloses an authentication method for use in an authentication device. The authentication device comprises an image capturing module, a wireless communication module and a processing module. The authentication method comprises the following steps of: capturing a quick response code (QR code) from a mobile device via the image capturing module, the QR code storing service data which includes an identification code assigned to the mobile device and a first hardware serial number of the mobile device; determining whether the identification code is valid after decoding the QR code to obtain the service data; receiving a wireless signal carrying a second hardware serial number via the wireless communication module; determining whether the first hardware serial number is identical to the second hardware serial number; and determining that the QR code passes authentication when the identification code is valid and the first hardware serial number is identical to the second hardware serial number.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. The present invention provides a mobile device, an authentication device and authentication methods thereof. It shall be appreciated that the embodiments of the present invention are not intended to limit the present invention to any specific environment, applications or particular implementations described in these embodiments. Therefore, the description of these embodiments is only for the purpose of illustration rather than limitation, and the scope of this application shall be governed by the claims. In the following embodiments and attached drawings, elements unrelated to the present invention are omitted from depiction; and dimensional relationships among individual elements in the attached drawings are illustrated only for ease of understanding, but not to limit the actual scale.

Figure 1:
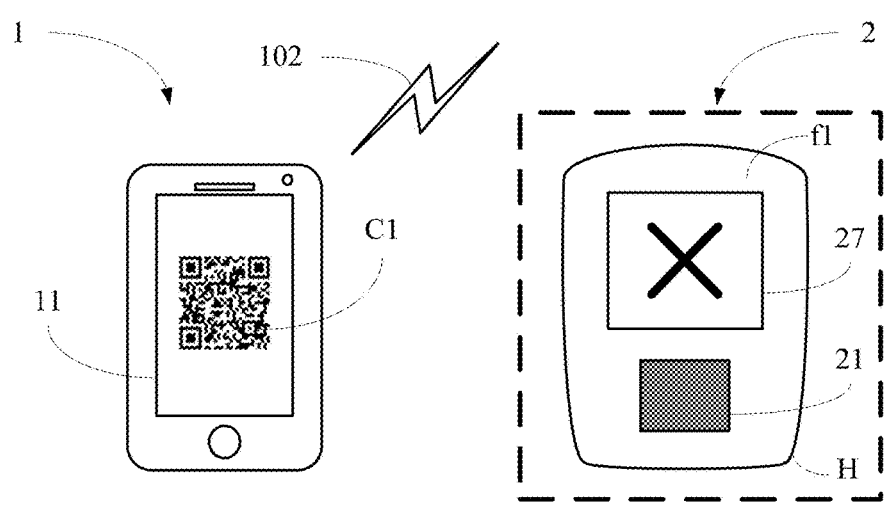
FIG. 1 depicts an implementation scenario of a mobile device 1 and an authentication device 2 according to the present invention.
Figure 2:
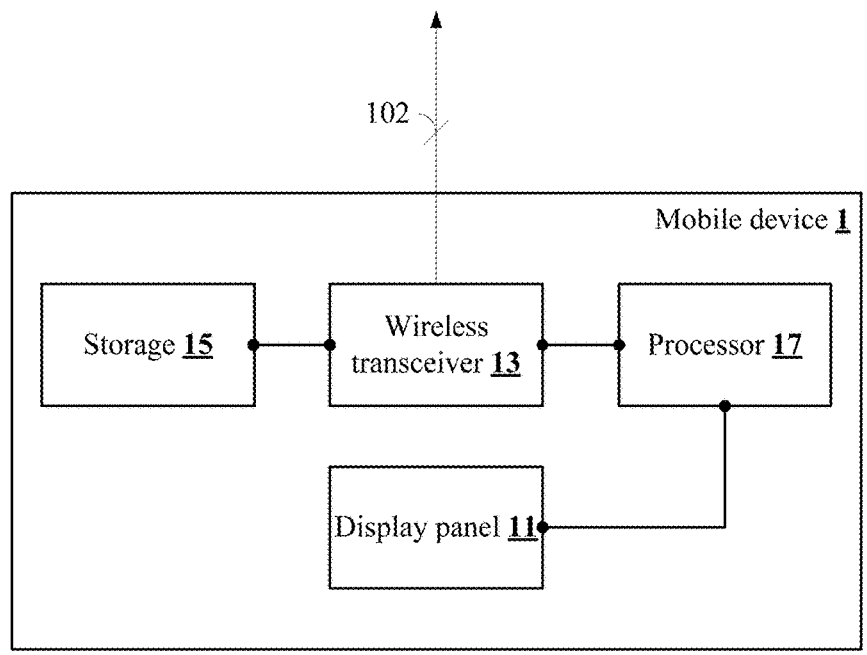
FIG. 2 is a schematic view of the mobile device 1 according to the present invention.

A first embodiment of the present invention is shown in FIG. 1. FIG. 1 depicts an implementation scenario of interactions between the mobile device 1 and the authentication device 2 according to the present invention. In the present invention, the mobile device 1 may be a smart phone with a display panel 11, and can execute an application to display a QR code C1 for being captured by the authentication device 2 and continuously transmit a wireless signal 102 carrying a hardware serial number of the mobile device 1 while the QR code C1 is being displayed. The wireless signal 102 may be a specially generated wireless signal (i.e., a wireless signal generated in response to the execution of the application) or a discovery wireless signal (e.g., a beacon signal) periodically transmitted when a wireless transceiver 13 (as shown in FIG. 2) of the wireless device 1 is activated.

Figure 3:
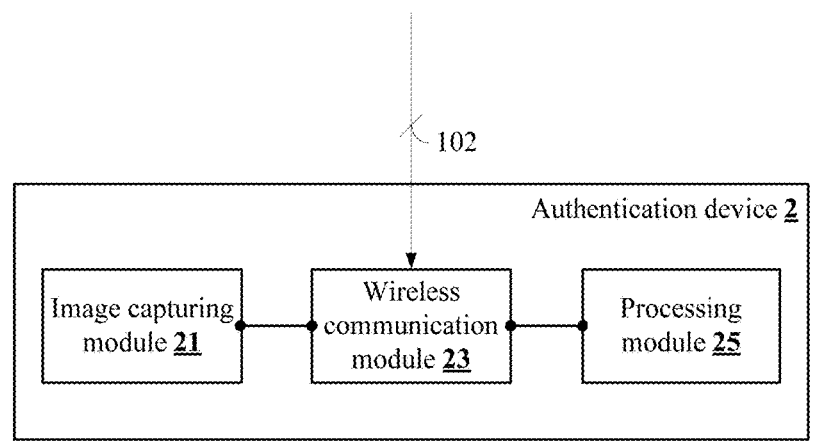
FIG. 3 is a schematic view of the authentication device 2 according to the present invention.

The authentication device 2 may be a terminal device, a terminal system or a user equipment (UE), e.g., a ticket checking machine, a Point of Sale (POS) device, a gate device, a gate control system, a smart phone or the like. The authentication device 2 has an image capturing module 21 disposed on the housing surface f1 of the housing H. When the QR code C1 displayed on the mobile device 1 is put in front of the image capturing module 21, the QR code C1 can be captured by the image capturing module 21. Additionally, the authentication device 2 of the present invention further has a wireless communication module 23 (as shown in FIG. 3) configured to receive wireless signals around.

The QR code of the present invention stores service data. The service data at least includes an identification code assigned to the mobile device 1 and the hardware serial number of the mobile device 1. The service data may be generated by the authentication device 2 itself or by a remote server and is transmitted to the mobile device 1. Additionally, the service data may be generated through an encryption procedure to improve the security of the service data, although this is not necessary. The authentication device 2 may store the identification code assigned to the mobile device 1 or the corresponding authentication code in a database (but not limited to this).

The authentication device 2 determines whether the identification code included in the service data is valid after capturing the QR code C1 and obtaining the service data. If the identification code is determined to be valid, the authentication device 2 detects whether there is a wireless signal around which carries the hardware serial number identical to that included in the service data. Because the mobile device 1 is near the authentication device 2, the wireless signal 102 is also received by the authentication device 2. The authentication device 2 confirms that the hardware serial number of the mobile device 1 carried in the wireless signal 102 is identical to the hardware serial number included in the service data to determine that the service data stored in the QR code C1 passes authentication. On the other hand, if the authentication device 2 finds that none of the wireless signals around carries the hardware serial number included in the service data, then it determines that the service data stored in the QR code C1 fails to pass authentication. In other words, if the authentication device 2 determines that none of the wireless signals around carries the hardware serial number included in the service data means that the QR code C1 might have been stolen.

For example, the authentication device 2 may comprise an output module 27, e.g., a display panel shown in FIG. 1, which is configured to display whether the service data stored in the QR code C1 that is captured in real time passes authentication. It shall be appreciated that, in addition to the display panel, the output module 27 may also be a speaker, a gate switch for controlling the open/close of the gate, an indicator lamp module or any hardware combination with a notifying function. The authentication device 2 may also not comprise an output module 27, but transmit a notification message back to the mobile device 1 so that the user can learn whether he or she passes authentication. Therefore, the output module 27 shown in FIG. 1 is provided only as an example, but is not to limit implementations of the present invention.

It shall be appreciated that the authentication device 2 is not limited to firstly determining whether the identification code is valid or determining whether there is a wireless signal around carrying the hardware serial number included in the service data after obtaining the service data. In other words, the present invention may also firstly determine whether there is a wireless signal around carrying the hardware serial number included in the service data and then determine whether the identification code is invalid after confirming that the hardware serial number carried in the wireless signal is identical to the hardware serial number included in the service data. If the identification code is valid and the hardware serial number carried in the wireless signal is identical to the hardware serial number included in the service data, the authentication device 2 determines that the service data stored in the QR code passes authentication.

A second embodiment of the present invention is shown in FIGS. 2 and 3. FIG. 2 is a schematic view of the mobile device 1 according to the present invention. The mobile device 1 comprises a display panel 11, a wireless transceiver 13, a storage 15 and a processor 17. For example, the wireless transceiver 13 may be one of a Wireless Fidelity (Wi-Fi) transceiver, a Bluetooth transceiver, a Near Field Communication (NFC) transceiver, and any combinations thereof, or be any hardware module with a wireless signal transmission function. The storage 15 may be any storage medium configured to store the QR code C1 for being captured by the authentication device 2. The processor 17 is electrically connected to the display panel 11, the wireless transceiver 13 and the storage 15, and is configured to enable the display panel 11 to display the QR code C1, and continuously transmit the wireless signal 102 carrying the hardware serial number via the wireless transceiver 13.

FIG. 3 is a schematic view of the authentication device 2 according to the present invention. The authentication device 2 comprises an image capturing module 21, a wireless communication module 23 and a processing module 25. The image capturing module 21 is configured to capture the QR code C1 from the mobile device 1. For example, the image capturing module 21 may be a camera or any component capable of capturing the graphic representation of the QR code. Additionally, the wireless communication module may be one of a Wi-Fi module, a Bluetooth module, a NFC module, or any combinations thereof, or be any hardware module with a wireless signal transmission function. It shall be appreciated that the wireless communication module may be a wireless communication receiver with a receiving function or a wireless communication transceiver with both a transmitting function and receiving function. The processing module 25 may be a processor, a logic control circuit or a host (but is not limited thereto).

As described above, the QR code stores service data. The service data comprises an identification code assigned to the mobile device 1 and the hardware serial number (also called the first hardware serial number) of the mobile device 1. The wireless communication module 23 is configured to receive the wireless signal 102 carrying a hardware serial number (also called the second hardware serial number). The processing module 25 is electrically connected to the image capturing module 21 and the wireless communication module 23, and is configured to determine whether the first hardware serial number is identical to the second hardware serial number after capturing the QR code C1 and receiving the wireless signal 102. If the first hardware serial number is identical to the second hardware serial number, it is determined that the QR code C1 passes authentication. On the other hand, if the first hardware serial number is not identical to the second hardware serial number, then the authentication device 2 determines that the QR code C1 fails to pass authentication.

Figure 4:
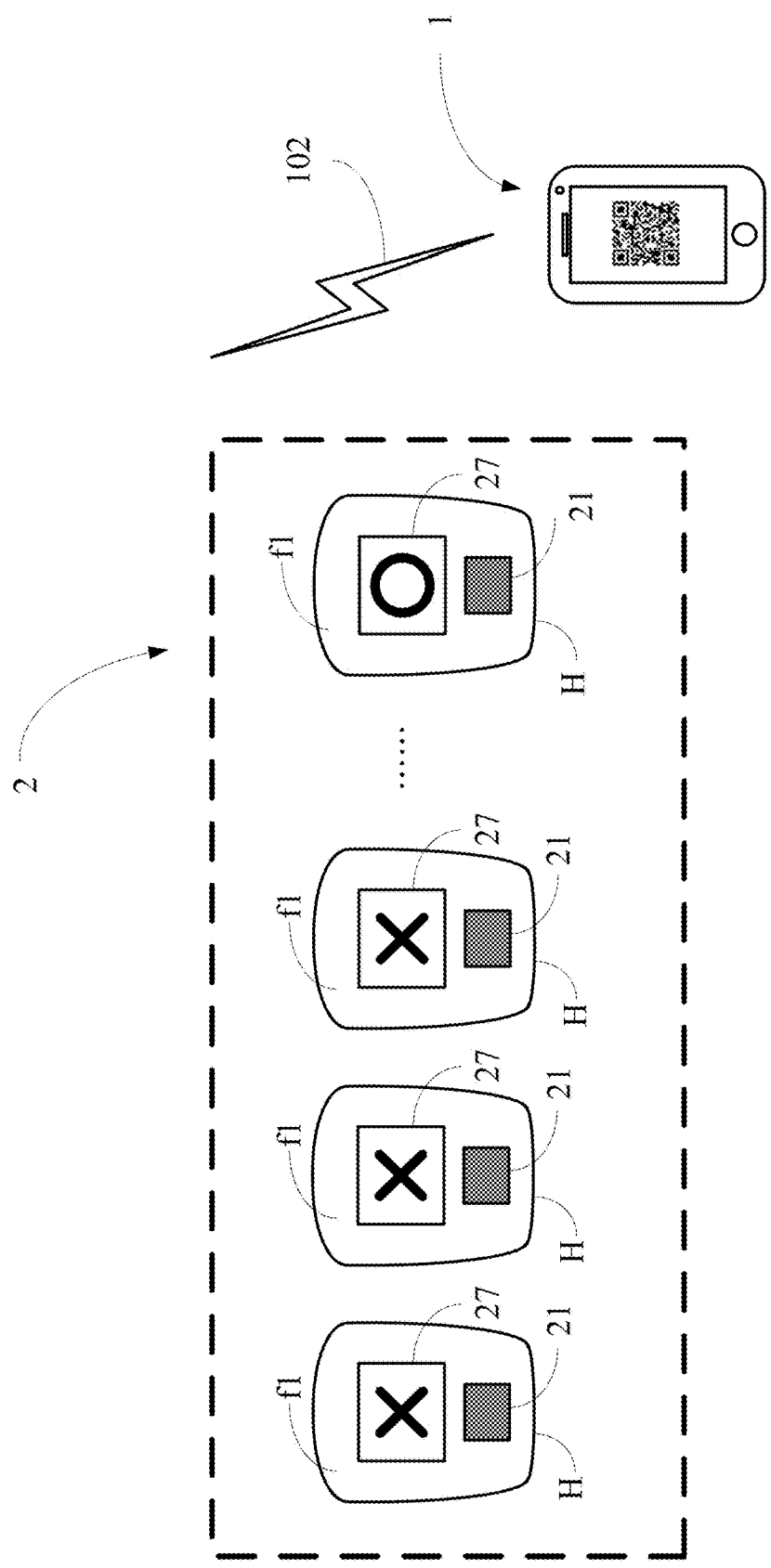
FIG. 4 depicts another implementation scenario of a mobile device 1 and an authentication device 2 according to the present invention.

A third embodiment of the present invention is shown in FIG. 4. The third embodiment is an extension of the second embodiment. FIG. 4 depicts another implementation scenario of a mobile device 1 and an authentication device 2 according to the present invention. In this embodiment, the authentication device 2 comprises a plurality of housings H, and a housing surface f1 of each of the housings H is provided with an image capturing module 21 and an output module 27. For example, the authentication device 2 may be a gate control system of a high-speed railway. Each of the housings H is a part of a gate controller.

Additionally, each of the gate controllers may be provided with a respective processing module 25 to control the respective gate, or may all be electrically connected to a single processing module 25 for controlling all the gates. When all the gate controllers are controlled by a single processing module 25, the processing module 25 may be disposed inside one of the gate controllers, or be disposed outside the gate controllers. For example, in case of being a host, the processing module 25 may be electrically connected to each of the gate controllers.

Also, the processing modules 25 of the gate controllers may be electrically connected to a single wireless communication module 23 to receive wireless signals around via the single wireless communication module 23. The wireless communication module 23 may be disposed inside one of the gate controllers, or be disposed outside the gate controllers. For example, when the processing module 25 is a host, the wireless communication module 23 may be disposed inside the housing of the host or be electrically connected to the host via a control line.

In other words, in this embodiment, after each of the image capturing modules 21 has captured the QR code and transmitted the corresponding image data to the processing module 25, the processing module 25 decodes the QR code to obtain the service data therefrom and, meanwhile, detects whether there is a wireless signal around which carries a hardware serial number identical to the hardware serial number included in the service data via the wireless communication module 23 to determine whether the QR code passes authentication. Because those of ordinary skill in the art can appreciate from the above embodiment that there is no limitation on the numbers of image capturing modules 21, the wireless communication modules 23 and the processing modules 25 of the authentication device 2 in practical implementations, the implementations that can be readily devised all fall within the scope of the present invention.

Figure 5:
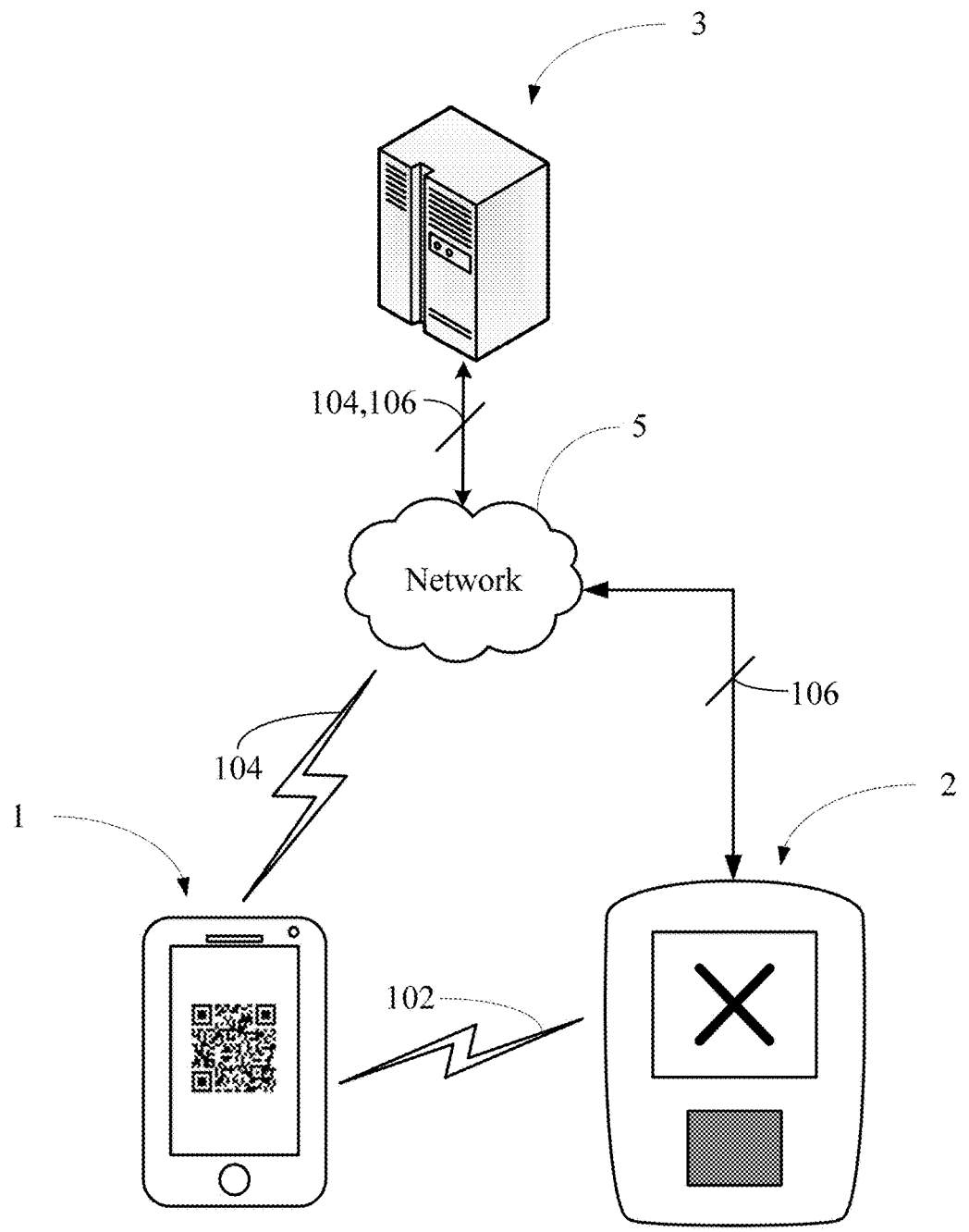
FIG. 5 depicts another implementation scenario of a mobile device 1 and an authentication device 2 according to the present invention.

A fourth embodiment of the present invention is shown in FIG. 5. The fourth embodiment is also an extension of the second embodiment. FIG. 5 depicts another implementation scenario of a mobile device 1 and an authentication device 2. As shown in FIG. 5, the mobile device 1 and the authentication device 2 connect to a service device 3 via a network 5 respectively. The network 5 may be a mobile communication network, Internet, local area network (LAN), the like, or any combinations thereof. The service device 3 may be a server providing a user service, e.g., a high-speed railway ticket service server.

Specifically, in this embodiment, the processor 17 of the mobile device 1 generates a service request message 104 including a hardware serial number of the mobile device 1, and connects to the network 5 via the wireless transceiver 13 to transmit the service request message 104 carrying the hardware serial number to the service device 3. For example, the service request message 104 may be a ticket-booking request message.

Then, the service device 3 that has received the service request message 104 generates a service data according to the service request message 104, or further generates the QR code C1 according to the generated service data, and transmits the service data or the QR code C1 back to the mobile device 1. Accordingly, the processor 17 may further receive the service data or the QR code C1 from the service device 3 via the wireless transceiver 13. If the service data is received by the processor 17 from the service device 3, then the QR code C1 is generated by the processor 17 according to the service data. As described above, the service data may be generated through an encryption procedure although this is not necessary.

The authentication device 2 further comprises a network module (not shown) and a storage module (not shown) that are electrically connected to the processing module 25. The network module may be an Ethernet module, and the storage module may be a storage medium such as a flash memory or a hard disk. The processing module 25 connects to the network 5 via the network module to receive an authentication data from the service device 3 and store the authentication data in the storage module. The authentication data at least includes the identification code assigned to the mobile device 1. Accordingly, the processing module 25 can determine whether the identification code in the authentication service data stored in the QR code C1 is valid according to the identification code assigned to the mobile device 1 that is included in the authentication data.

As an example, when the service device 3 is a high-speed railway service server and the authentication device 2 is a gate control system of the high-speed railway, the user may transmit a service request message 104 carrying the hardware serial number of the mobile device 1 to the service device 3 after using the mobile device 1 to complete a ticket-booking procedure on a website or an application associated with the service device 3. It shall be appreciated that the website or application associated with the service device 3 is not limited to a website or application provided directly by the service device 3, but may also be provided by a third-party service system. In this case, the service request message 104 may also be transmitted by the mobile device 1 to the service device 3 via the third-party service system.

After receiving the service request message 104, the service device 3 generates an identification code representing a ticket according to the service request message 104, and generates the service data according to the identification code and the hardware serial number of the mobile device 1. The service device 3 may also generate the QR code C1 according to the service data and store the service data in the QR code C1. Subsequently, the service device 3 transmits the service data or the QR code C1 to the mobile device 1 and, meanwhile, transmits an authentication data 106 including the identification code representing the ticket to the authentication device 2.

When the user carries the mobile device 1 to pass the gate of the high-speed railway, the user may execute an application in the mobile device 1 to display the QR code C1. At this time, it shall be ensured that the wireless transceiver 13 is activated. After capturing the QR code C1 from the mobile device 1, the authentication device 2 determines whether the identification code in the service data stored in the QR code C1 is valid, and further determines whether there is a received wireless signal 102 carrying a hardware serial number identical to the hardware serial number included in the authentication service data. The gate will be opened by the authentication device 2 to allow the user to pass through if the identification code in the authentication service data is valid and the received wireless signal 102 carries a hardware serial number identical to the hardware serial number included in the authentication service data. It can be seen that, as compared with the prior art which merely compares the service data stored in the QR code C1 with the data in the database simply, the authentication mechanism of the present invention further confirms the hardware serial number by means of a real-time wireless signal to improve the security and prevent the QR code from unauthorized use.

Figure 6:
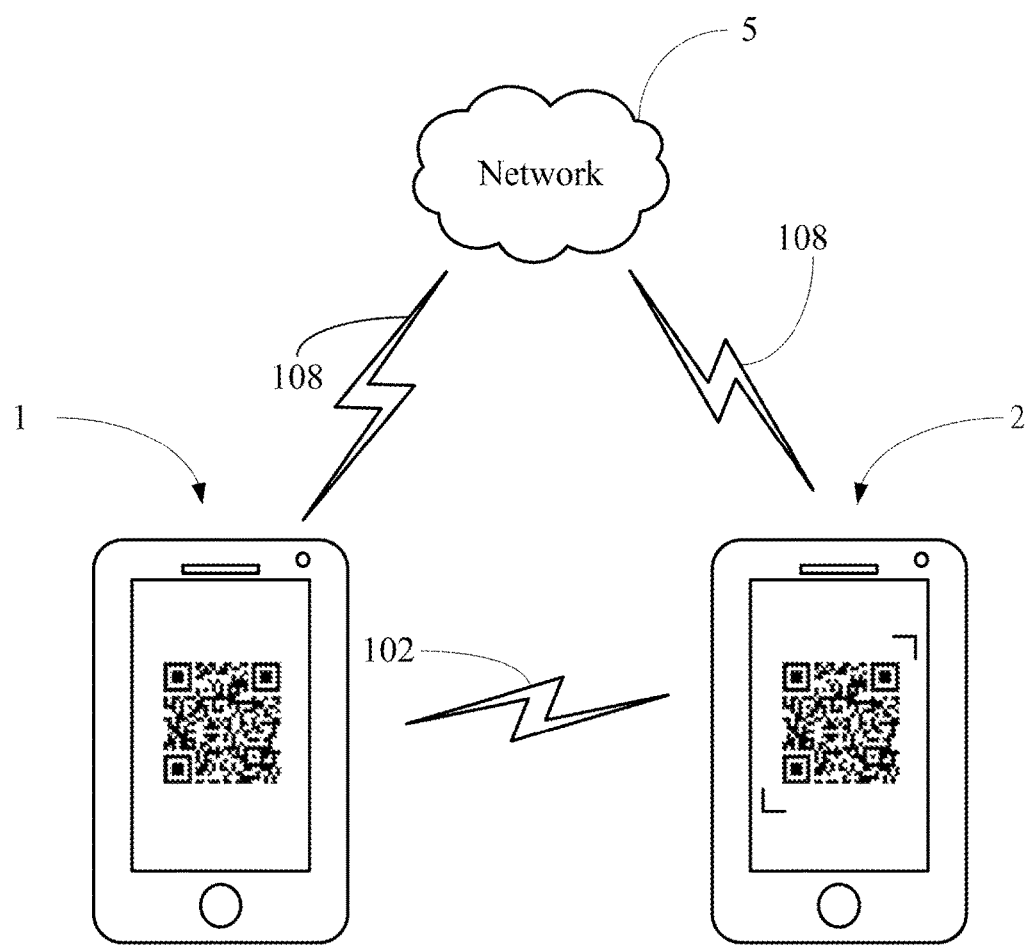
FIG. 6 depicts another implementation scenario of a mobile device 1 and an authentication device 2 according to the present invention.

The fifth embodiment of the present invention is shown in FIG. 6. The fifth embodiment is also an extension of the second embodiment. In this embodiment, the authentication device 2 is a different mobile device, e.g., a smart phone. For example, if the user of the mobile device 1 is to make a face-to-face transaction with the user of the authentication device 2, the mobile device 1 generates a transaction request message 108 and transmits the transaction request message 108 to the authentication device 2 via the network 5. The transaction request message 108 at least comprises transaction-related information and the hardware serial number of the mobile device 1.

After receiving the transaction request message 108, the authentication device 2 generates an identification code representing the transaction according to the transaction request message 108, and generates a service data according to the hardware serial number and the identification code of the mobile device 1. Furthermore, the authentication device 2 may also generate the QR code C1 according to the service data to store the service data in the QR code C1. Then, the authentication device 2 transmits the service data or the QR code C1 to the mobile device 1.

When the user of the mobile device 1 meets the user of the authentication device 2 fact to face, the authentication device 2 may capture the QR code C1 displayed on the mobile device 1 by a camera of the authentication device 2 to obtain the authentication service data, and meanwhile, determine whether a received wireless signal carries a hardware serial number identical to the hardware serial number included in the authentication service data to determine whether the QR code 1 passes authentication. It can be seen that, as compared with the prior art which merely compares the service data stored in the QR code C1 with data in the database simply, the authentication mechanism of the present invention further confirms the hardware serial number by means of a real-time wireless signal to improve the security and prevent the QR code from unauthorized use.

Figure 7:
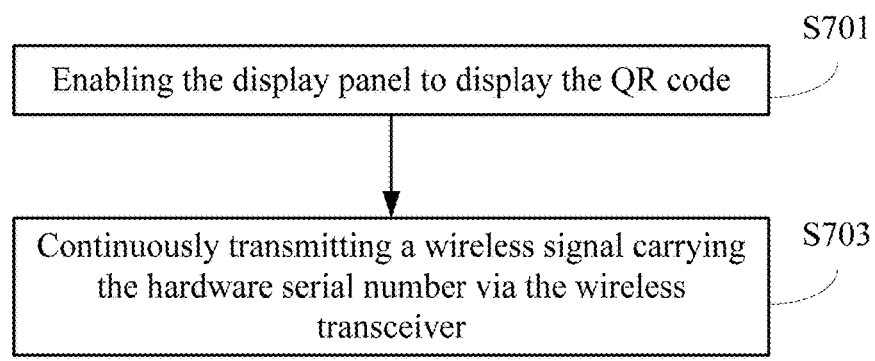
FIG. 7 is a flowchart diagram of an authentication method for use in the mobile device 1 according to the present invention.

A sixth embodiment of the present invention is an authentication method, a flowchart diagram of which is shown in FIG. 7. The authentication method is for use in a mobile device (e.g., the mobile device 1 of the previous embodiments). The mobile device comprises a display panel, a wireless transceiver, a storage and a processor. The storage stores a QR code. The QR code stores service data which includes an identification code assigned to the mobile device and the first hardware serial number of the mobile device. The authentication method is executed by the processor.

First, step S701 is executed to enable the display panel to display the QR code. As previously described, the mobile device must firstly display the QR code thereon when it is to be authenticated in the authentication service so that the authentication device determines that the identification code is valid after obtaining the service data. Then, step S703 is executed to continuously transmit a wireless signal carrying the hardware serial number via the wireless transceiver so that the authentication device determines that the QR code passes authentication according to the identification code and the hardware serial number after receiving the wireless signal carrying the hardware serial number.

In addition to the aforesaid steps, the authentication method of the present invention can also execute all operations described in the previous embodiments and have all corresponding functions. The method in which the embodiment executes these functions and have the corresponding functions can be appreciated by those of ordinary skill in the art from the previous embodiments and thus, will not be further described herein.

Additionally, the authentication method of the present invention may be implemented by a computer readable medium that records an application. When the application is loaded and installed into an electronic device, the codes in the application will be executed by the processor of the electronic device to execute the authentication method of the present invention. The computer readable medium is, for example, a read only memory (ROM), a flash memory, a floppy disk, a hard disk, a compact disk (CD), a mobile disk, a magnetic tape, a database accessible to a network, or any other storage with the same functionality that is well known to those skilled in the art.

Figure 8:
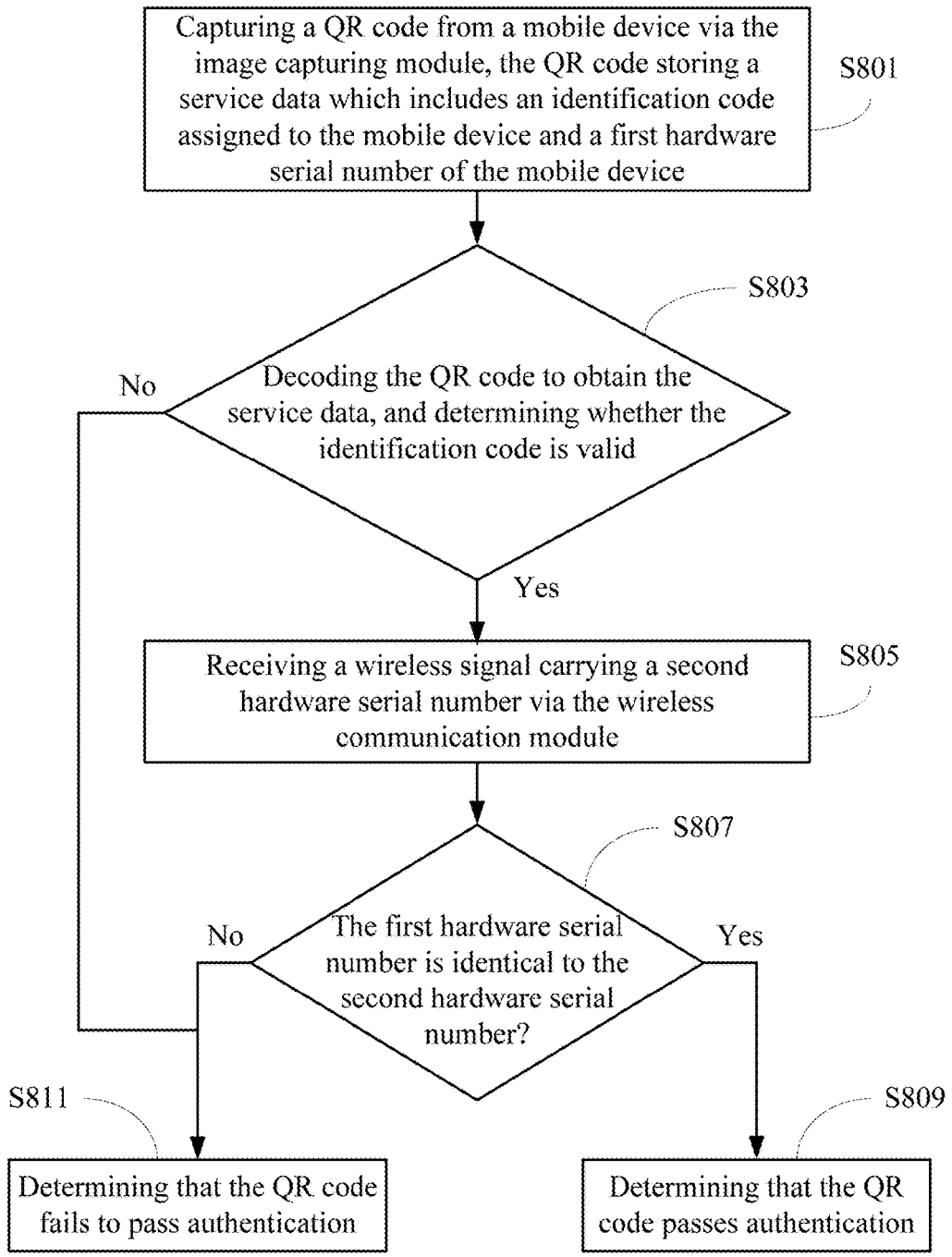
FIG. 8 is a flowchart diagram of an authentication method for use in the authentication device 2 according to the present invention.

A seventh embodiment of the present invention is an authentication method, a flowchart diagram of which is shown in FIG. 8. The authentication method is for use in an authentication device (e.g., the authentication device 2 of the previous embodiment). The authentication device comprises an image capturing module, a wireless communication module and a processing module. The authentication method is executed by the processing module.

First, step S801 is executed to capture a QR code from a mobile device via the image capturing module. The QR code stores service data which includes an identification code assigned to the mobile device and the first hardware serial number of the mobile device. Step S803 is executed to decode the QR code to obtain the service data and determine whether the identification code is valid. Then if the identification code is valid, step S805 is executed to receive a wireless signal carrying a second hardware serial number via the wireless communication module. After the QR code is captured and the wireless signal is received, step S807 is executed to determine whether the first hardware serial number is identical to the second hardware serial number. If the first hardware serial number is identical to the second hardware serial number, then step S809 is executed to determine that the QR code passes authentication. Conversely, if the first hardware serial number is not identical to the second hardware serial number, step S811 is executed to determine that the QR code fails to pass authentication.

Additionally, if the identification code is invalid in step S803, then step S811 is executed directly to determine that the QR code fails to pass authentication. It shall be appreciated that, in this embodiment, step S805 is executed after step S803; i.e., the processing module determines that the identification code is valid first before receiving the wireless signal via the wireless communication module to determine whether the received wireless signal carries a hardware serial number identical to the first hardware serial number. However, in other embodiments, the processing module may also execute step S805 first to receive a wireless signal carrying the second hardware serial number and temporarily store the second hardware serial number, and then execute step S803 to decode the QR code to obtain service data and determine whether the identification code is valid. Next, step S807 is executed after the identification code is determined to be valid.

In addition to the aforesaid steps, the authentication method of the present invention can also execute all operations described in the previous embodiments and have all corresponding functions. The method in which the embodiment executes these functions and have the corresponding functions can be appreciated by those of ordinary skill in the art from the previous embodiments, and thus, will not be further described herein.

Additionally, the authentication method of the present invention may be implemented by a computer readable medium that records an application. When the application is loaded and installed into an electronic device, the codes in the application will be executed by a processor of the electronic device to execute the authentication method of the present invention. The computer readable medium is, for example, a read only memory (ROM), a flash memory, a floppy disk, a hard disk, a compact disk (CD), a mobile disk, a magnetic tape, a database accessible to a network, or any other storage with the same functionality that is well known to those skilled in the art.

According to the above descriptions, the authentication method of the present invention has a displayed QR code that stores both an identification code assigned to the mobile device and the hardware serial number of the mobile device. The mobile device transmit a wireless signal carrying the hardware serial number of the mobile device. When the mobile device is authenticated by the authentication device according to the QR code, the authentication device not only authenticates the identification code assigned to the mobile device but also receives a wireless signal carrying the hardware serial number of the mobile device to compare the hardware serial number stored in the QR code with the hardware serial number carried by the wireless device. Thereby, the security is improved to prevent unauthorized use of the QR code.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A mobile device, comprising:
a display panel;
a wireless transceiver;
a storage, being configured to store a quick response code (QR code) for being captured by an authentication device, the QR code storing service data which includes an identification code assigned to the mobile device and a hardware serial number of the mobile device so that the authentication device determines that the identification code is valid after obtaining the service data; and
a processor, electrically connected to the display panel, the wireless transceiver and the storage, being configured to enable the display panel to display the QR code, and continuously transmit a wireless signal carrying the hardware serial number via the wireless transceiver so that the authentication device determines that the QR code passes authentication according to the identification code and the hardware serial number after receiving the wireless signal carrying the hardware serial number;

wherein the processor further connects to a network via the wireless transceiver, and transmits a service request message carrying the hardware serial number to a service device so that the service device generates the service data according to the service request message after receiving the service request message.

2. The mobile device of claim 1, wherein the processor further receives one of the service data and the QR code from the service device via the wireless transceiver, and generates the QR code according to the service data after receiving the service data.

3. The mobile device of claim 1, wherein the service data is generated through an encryption procedure.

4. The mobile device of claim 1, wherein the processor generates the wireless signal, and continuously transmits the wireless signal via the wireless transceiver when enabling the display panel to display the QR code.

5. The mobile device of claim 1, wherein the wireless transceiver is one of a Wi-Fi transceiver, a Bluetooth transceiver, a near field communication (NFC) transceiver and any combination thereof.

6. An authentication device, comprising:
an image capturing module, being configured to capture a quick response code (QR code) from a mobile device, the QR code storing service data which includes an identification code assigned to the mobile device and a first hardware serial number of the mobile device;
a wireless communication module, being configured to receive a wireless signal carrying a second hardware serial number;
a processing module, electrically connected to the image capturing module and the wireless communication module, being configured to determine whether the identification code is valid and determine whether the first hardware serial number is identical to the second hardware serial number after obtaining the service data by decoding the QR code, and determine that the QR code passes authentication when the identification code is valid and the first hardware serial number is identical to the second hardware serial number;
a network module; and
a storage module electrically connected to the processing module;
wherein the processing module further connects to a network via the network module to receive authentication data from a service device and stores the authentication data in the storage module, and the authentication data includes the identification code assigned to the mobile device.

7. The authentication device of claim 6, wherein the service data is generated through an encryption procedure, and the processing module further decrypts the service data to obtain the identification code and the first hardware serial number.

8. The authentication device of claim 6, wherein the wireless communication module is one of a Wi-Fi module, a Bluetooth module, a near field communication (NFC) module and any combination thereof.

9. An authentication method for use in a mobile device, the mobile device comprising a display panel, a wireless transceiver, a storage and a processor, the storage being configured to store a quick response code (QR code) for being captured by an authentication device, the authentication method comprising the following steps of:

enabling the display panel to display the QR code, the QR code storing service data which includes an identification code assigned to the mobile device and a hardware serial number of the mobile device so that the authentication device determines that the identification code is valid after obtaining the service data;

continuously transmitting a wireless signal carrying the hardware serial number via the wireless transceiver so that the authentication device determine that the QR code passes authentication according to the identification code and the hardware serial number after receiving the wireless signal carrying the hardware serial number; and connecting to a network via the wireless transceiver, and transmitting a service request message carrying the hardware serial number to a service device so that the service device generates the service data according to the service request message after receiving the service request message.

10. The authentication method of claim 9, further comprising:
receiving one of the service data and the QR code from the service device via the wireless transceiver; and
generating the QR code according to the service data after receiving the service data.

11. The authentication method of claim 9, wherein the service data is generated through an encryption procedure.

12. The authentication method of claim 9, further comprising:
generating the wireless signal and continuously transmitting the wireless signal via the wireless transceiver when enabling the display panel to display the QR code.

13. The authentication method of claim 9, wherein the wireless transceiver is one of a Wi-Fi transceiver, a Bluetooth transceiver, a near field communication (NFC) transceiver and any combination thereof.

14. An authentication method for use in an authentication device, the authentication device comprising an image capturing module, a wireless communication module and a processing module, the authentication method comprising the following steps of:
capturing a quick response code (QR code) from a mobile device via the image capturing module, the QR code storing service data which includes an identification code assigned to the mobile device and a first hardware serial number of the mobile device, wherein the service data is generated through an encryption procedure;
determining whether the identification code is valid after decoding the QR code to obtain the service data;
receiving a wireless signal carrying a second hardware serial number via the wireless communication module;
determining whether the first hardware serial number is identical to the second hardware serial number;
determining that the QR code passes authentication when the identification code is valid and the first hardware serial number is identical to the second hardware serial number; and
decrypting the service data to obtain the identification code and the first hardware serial number.

15. The authentication method of claim 14, wherein the authentication device further comprises a network module and a storage module, and the authentication method further comprises the following step of:
connecting to a network via the network module to receive an authentication data from a service device, and storing the authentication data in the storage module, the authentication data including the identification code assigned to the mobile device.

16. The authentication method of claim 14, wherein the wireless communication module is one of a Wi-Fi module, a Bluetooth module, a near field communication (NFC) module and any combination thereof.

* * * * *